(12) United States Patent
Lohbeck et al.

(10) Patent No.: US 10,908,575 B2
(45) Date of Patent: Feb. 2, 2021

(54) INDUSTRIAL CONTROL SYSTEM WITH COMMUNICATION BAR AND POWER BAR

(71) Applicant: ABB Schweiz AG, Baden (CH)

(72) Inventors: Axel Lohbeck, Zhejiang (CN); Jianlie Li, Zhejiang (CN)

(73) Assignee: ABB Schweiz AG, Baden (CH)

( * ) Notice: Subject to any disclaimer, the term of this patent is extended or adjusted under 35 U.S.C. 154(b) by 793 days.

(21) Appl. No.: 15/417,769

(22) Filed: Jan. 27, 2017

(65) Prior Publication Data
US 2017/0139387 A1 May 18, 2017

Related U.S. Application Data

(63) Continuation of application No. PCT/CN2014/083652, filed on Aug. 4, 2014.

(51) Int. Cl.
G05B 19/042 (2006.01)

(52) U.S. Cl.
CPC ............ *G05B 19/0423* (2013.01); *G05B 2219/25004* (2013.01)

(58) Field of Classification Search
CPC .................................... G05B 19/0423
See application file for complete search history.

(56) References Cited

U.S. PATENT DOCUMENTS

| | | |
|---|---|---|
| 5,247,450 A | 9/1993 | Clark |
| 5,978,593 A * | 11/1999 | Sexton ............... G05B 19/054 710/1 |
| 6,037,857 A * | 3/2000 | Behrens ............. G05B 19/0423 307/326 |
| 6,327,511 B1 * | 12/2001 | Naismith ........... G05B 19/4185 700/19 |
| 6,745,232 B1 * | 6/2004 | Blech ..................... B65G 37/02 700/13 |

(Continued)

FOREIGN PATENT DOCUMENTS

| CN | 101853018 A | 10/2010 |
|---|---|---|
| CN | 101866147 A | 10/2010 |

(Continued)

OTHER PUBLICATIONS

Extended European Search Report dated Feb. 9, 2018 in corresponding European application No. 14899554.1 (8 pages).

(Continued)

*Primary Examiner* — Ronald D Hartman, Jr.
(74) *Attorney, Agent, or Firm* — Taft Stettinius & Hollister LLP; J. Bruce Schelkopf

(57) ABSTRACT

An industrial control system with communication bar and power bar is provided. The industrial control system comprises a plurality of I/O modules; a plurality of terminal boards; at least one communication bar having an input connected with a controller and a plurality of output interfaces, wherein each output interface connects with one I/O module or one terminal board; at least one power bar having an input connected with power supply and a plurality of output interfaces, wherein each output interface connects with one I/O module or one terminal board; wherein each I/O module communicates with one corresponding terminal board through the communication bar respectively.

18 Claims, 4 Drawing Sheets

(56) References Cited

U.S. PATENT DOCUMENTS

| | | | | |
|---|---|---|---|---|
| 9,032,522 | B1* | 5/2015 | Mulder | G06F 21/552 726/23 |
| 2003/0005196 | A1* | 1/2003 | Reed | G05B 19/05 710/300 |
| 2007/0055470 | A1* | 3/2007 | Pietrzyk | G06K 7/0008 702/104 |
| 2007/0142941 | A1* | 6/2007 | McGreevy | G06Q 10/00 700/83 |
| 2007/0173079 | A1* | 7/2007 | Kumar | G05B 19/054 439/50 |
| 2008/0052435 | A1* | 2/2008 | Norwood | H05K 7/1467 710/301 |
| 2008/0140888 | A1* | 6/2008 | Blair | G05B 19/054 710/104 |
| 2008/0301343 | A1* | 12/2008 | Adragna | G06F 13/4077 710/107 |
| 2009/0117934 | A1* | 5/2009 | Biehler | G05B 19/4185 455/525 |
| 2009/0231810 | A1 | 9/2009 | Liang et al. | |
| 2013/0307514 | A1 | 11/2013 | O'Connell et al. | |
| 2014/0094939 | A1 | 4/2014 | Pierce | |
| 2015/0097571 | A1* | 4/2015 | Wei | G01R 31/50 324/531 |

FOREIGN PATENT DOCUMENTS

| | | |
|---|---|---|
| CN | 101976074 A | 2/2011 |
| CN | 102331751 A | 1/2012 |
| CN | 102593724 A | 7/2012 |
| CN | 103064302 A | 4/2013 |
| CN | 103425063 A | 12/2013 |
| CN | 103425079 A | 12/2013 |
| EP | 0366468 A2 | 5/1990 |
| EP | 0499393 A2 | 8/1992 |
| EP | 0883043 A2 | 12/1998 |
| EP | 1688840 A2 | 8/2006 |
| EP | 2187275 A1 | 5/2010 |
| EP | 2241980 A1 | 10/2010 |

OTHER PUBLICATIONS

State Intellectual Property Office of the P.R. China, International Search Report & Written Opinion issued in corresponding Application No. PCT/CN2014/083652, dated Dec. 31, 2014, 9 pp.

Chinese Office Action, Chinese Patent Application No. 201480080989.X, dated Jun. 20, 2018, 20 pages including machine translation in English.

Chinese Office Search Report, Chinese Patent Application No. 201480080989.X, dated Jun. 20, 2018, 4 pages including machine translation in English.

European Patent Office, Communication pursuant to Article 94(3) EPC issued in corresponding European application No. 148995541, dated Jul. 8, 2020, 6 pp.

The State Intellectual Property Office of People's Republic of China, Chinese Third Office Action issued in corresponding Chinese application No. 201480080989.X, dated Oct. 21, 2020, 15 pp.

The State Intellectual Property Office of People's Republic of China, Chinese Reexamination Decision issued in corresponding Chinese application No. 201480080989.X, dated Sep. 16, 2020, 23 pp.

* cited by examiner

INDUSTRIAL CONTROL SYSTEM WITH COMMUNICATION BAR AND POWER BAR

FIELD OF INVENTION

Embodiments of the present disclosure generally relate to an industrial control system, and more particularly, to an industrial control system with a communication bar and a power bar.

BACKGROUND OF INVENTION

An industrial control system is now frequently used in many industrial fields. A main purpose of the industrial control system is to automatically control devices in the field. Normally, the industrial control system comprises an engineering station, an operation station, a controller, an I/O station, terminal boards and devices in the field.

In a distributed control system (DCS), there is a cabinet for mounting and installing DCS components. Controllers, I/O (input/output) stations and terminal boards are usually installed in one or several cabinets. In order to power the control system, there will be several power supplies in the cabinet.

In order to exchange data between the controllers and the I/O stations, there will be communication lines for data exchange. The physical structures of the communication lines might be different according to different protocols.

Based on the above, the DCS cabinet needs a power cable to connect with power supplies and/or a communication cable to link to communication lines. There is certain risk to use the wrong cables or connect to the wrong terminal boards with such power cables and communication cables, and it may cause some damage to the DCS system.

SUMMARY OF INVENTION

In order to address the foregoing and other potential problems, embodiments of the present disclosure propose an industrial control system comprising power bars and/or communication bars.

In one aspect, embodiments of the present disclosure provide an industrial control system comprising: a plurality of I/O modules; a plurality of terminal hoards; at least one communication bar having an input connected with a controller and a plurality of output interfaces, wherein each output interface connects with one I/O module or one terminal board; and at least one power bar having an input connected with power supply and a plurality of output interfaces, wherein each output interface connects with one I/O module or one terminal board; wherein each I/O module communicates with its corresponding terminal board through the communication bar respectively.

In one embodiment, the I/O modules or the terminal boards are installed on the power bar or the communication bar directly or through connectors and short cables.

In one embodiment, the communication bar comprises at least two conductive paths which are formed by conductive material.

In one embodiment, the output interfaces of the communication bar and the power bar are of different sizes, different inserting direction or different shapes.

In one embodiment, each I/O module is paired with one corresponding terminal board by presettable address and protocol.

In one embodiment, the industrial control system is a distributed control system.

In another aspect, embodiments of the present disclosure provide an industrial control system comprising: a plurality of I/O modules; a plurality of terminal boards; a plurality of communication cables, which connect a controller to the I/O modules, and connect each I/O module to one corresponding terminal board respectively; at least one power bar having an input connected with a power supply and a plurality of output interfaces, wherein each output interface connects with one I/O module or one terminal board.

In one embodiment, the I/O modules or the terminal hoards are directly installed on the power bar.

In one embodiment, wherein the I/O modules or the terminal boards connect to the power bar by connectors and short cables.

In yet another aspect, embodiments of the present disclosure provide an industrial control system comprising: a plurality of I/O modules; a plurality of terminal boards; at least one communication bar having an input connected with a controller and a plurality of output interfaces, wherein each output interface connects with one I/O module or one terminal board; a plurality of power cables, which connect a power supply with the I/O modules and the terminal boards respectively, wherein each I/O module communicates with one corresponding terminal board through the communication bar respectively.

In one embodiment, wherein the I/O modules or the terminal boards are directly installed on the communication bar.

In one embodiment, wherein the I/O modules or terminal boards are connected to the communication bar by connectors and short cables.

In one embodiment, the communication bar comprises at least two conductive paths which are formed by conductive material.

In one embodiment, each I/O module is paired with corresponding terminal board by presettable address and protocol.

According to the embodiments of the present disclosure, the cables in the control system cabinet can be significantly reduced, which can not only lower the risk of installation error but also save engineering time. Cabinet space can also be fully used for I/O modules so as to increase the capacity of single cabinet.

Other features and advantages of embodiments of the present disclosure will also be understood from the following description of specific exemplary embodiments when read in conjunction with the accompanying drawings, which illustrate, by way of example, the principles of the invention.

BRIEF DESCRIPTION OF DRAWINGS

Embodiments of the present disclosure will be presented in the sense of examples and their advantages are explained in greater detail below, with reference to the accompanying drawings, wherein.

Figure 1:
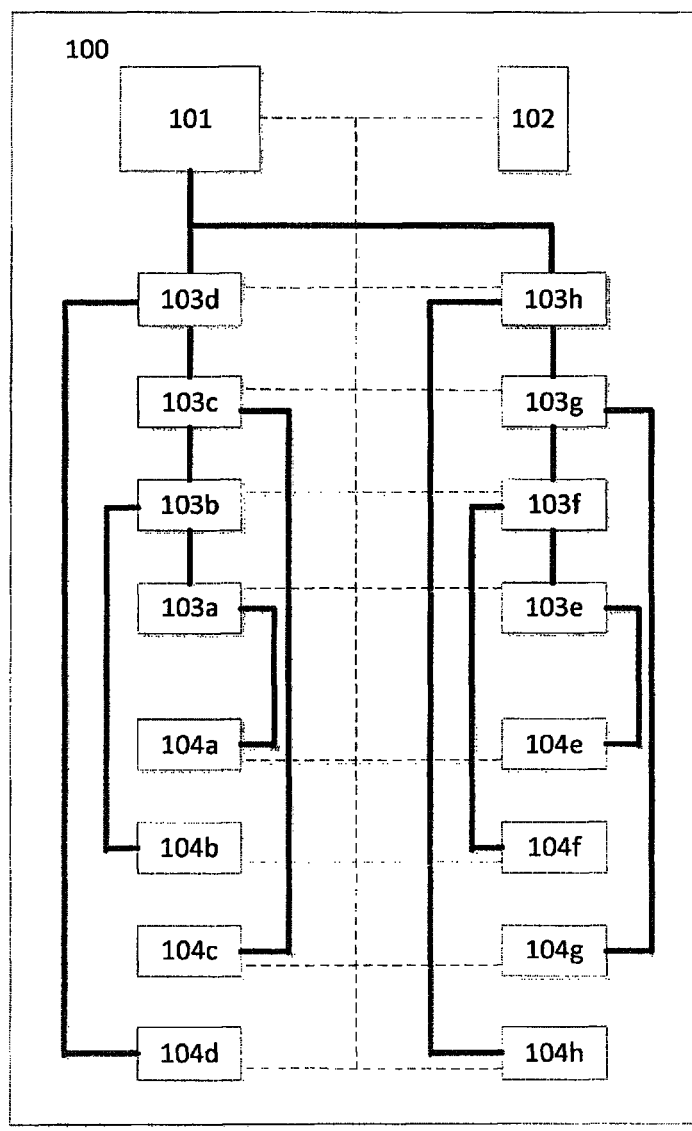
FIG. 1 is a diagram illustrating a cabinet of the industrial control system in the prior art.

All the figures are schematic, not necessarily to scale, and generally only show parts which are necessary in order to elucidate the invention, wherein other parts may be omitted or merely suggested.

DETAILED DESCRIPTION OF EMBODIMENTS

Hereinafter, the principle and spirit of the present disclosure will be described with reference to the illustrative embodiments. It should be understood, all these embodiments are given merely for the skilled in the art to better understand and further practice the present disclosure, but not for limiting the scope of the present disclosure. For example, features illustrated or described as part of one embodiment may be used with another embodiment to yield still a further embodiment. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the description with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 is a diagram illustrating a cabinet of an industrial control system in the prior art. As seen in FIG. 1, the industrial control system comprises a cabinet 100, which houses a controller 101, a power supply 102, a plurality of I/O modules (103a, 103b, . . . 103h) and a plurality of terminal boards (104a, 104b, . . . 104h). There are also many power cables (shown as dash line) and communication cables (shown as solid line). The power cables connect the power supply to the controller, the I/O modules and the terminal boards in order to power them. The communication cables connect the controller to the I/O modules, and further connect each I/O module to corresponding terminal board, such as I/O module 103a connects with terminal board 104a. The terminal board is used to connect to a signal line (not shown) which provides a signal, and the signal will be sent to a corresponding I/O module via the terminal board and then transferred to the controller by the I/O module.

In some application, there may be several controllers and several power supplies. The I/O modules can be independent of each other, or connected in series or in parallel by the communication cables. In other words, the I/O modules can communicate with each other or have no relationship. The power supply can power each I/O module and each terminal board respectively, or use one power cable to power several I/O modules (or terminal boards) connected in series.

For the layout in the prior art, there are many cables in one cabinet. It is not convenient for engineers to install an industrial control system. Furthermore, if the cables are connected to the wrong place, there is certain risk to damage the system.

Figure 2:
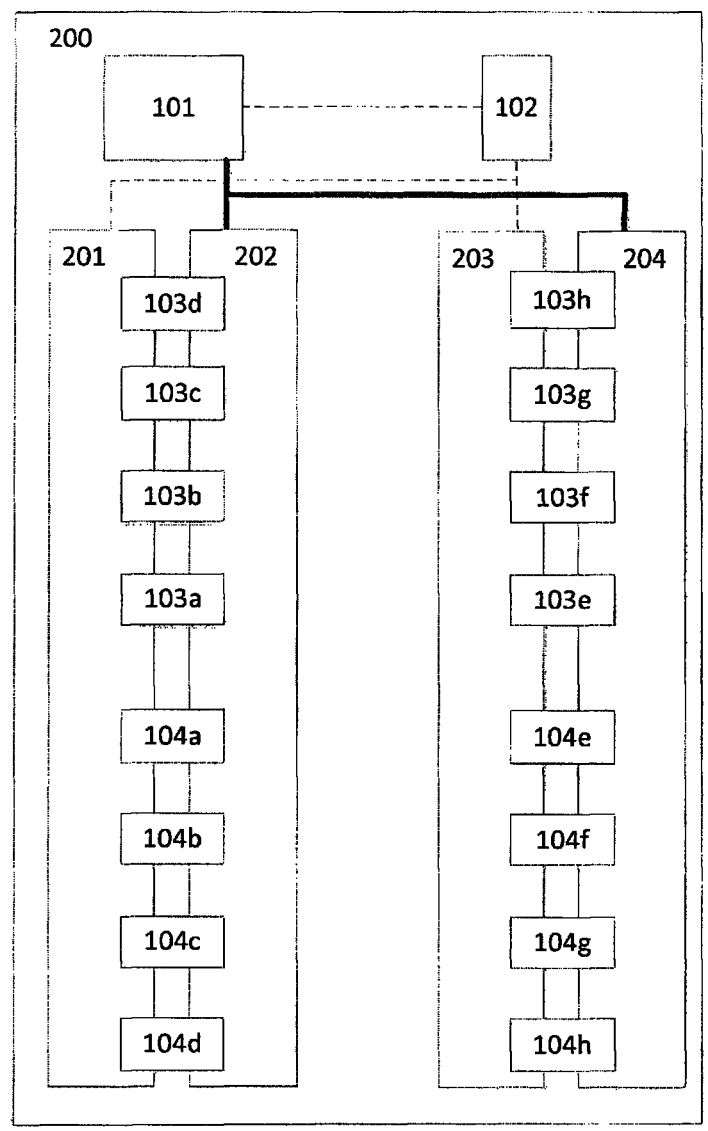
FIG. 2 is a diagram illustrating a cabinet of the industrial control system according to an embodiment of the present disclosure.

FIG. 2 is a diagram illustrating a cabinet of the industrial control system according to an embodiment of the present disclosure.

As shown in FIG. 2, embodiments of the present disclosure provide an industrial control system comprising at least one power bar and at least one communication bar. According to the embodiments of the present disclosure, a plurality of I/O modules and terminal boards may share one power bar or communication bar. The industrial control system can be CCS (concentrated computer control system), DCS (distributed control system), FCS (fieldbus control system), or the like.

According to an embodiment of the present disclosure, as shown in FIG. 2, the industrial control system comprises a cabinet 200, which houses a controller 101, a power supply 102, a plurality of I/O modules (103a, 103b, . . . 103h), a plurality of terminal boards (104a, 104b, . . . 104h), two power bars 201 and 203, and two communication bars 202 and 204.

Each communication bar has an input connected with the controller and a plurality of output interfaces, wherein each output interface connects with one I/O module or one terminal board. Each power bar has an input connected with the power supply and a plurality of output interfaces, wherein each output interface connects with one I/O module or one terminal board. Furthermore, each I/O module communicates with one corresponding terminal board through the communication bar respectively, such as I/O module 103a communicates with terminal board 104a. There are preset conductive paths in the communication bar for transmitting signals between the I/O module and the corresponding terminal board. The conductive paths can be formed by conductive material, such as copper. In one embodiment, there are at least two conductive paths in each of the communication bar. The output interfaces used for each of the I/O modules and the terminal boards in the communication bar can be the same, and one I/O module and its corresponding terminal hoard can be paired through communication protocol and physical address, which can be preset in the I/O modules and terminal boards. For example, after connecting I/O modules and terminal boards with the communication bar, each I/O module can be mated with its corresponding terminal board by broadcasting its type or other information. In this way, there is no need to distinguish interfaces used for I/O modules and terminal boards, which will significantly ease the work. It should be understood that the output interfaces used for each of the I/O modules and the terminal boards in the communication bar could be different.

In embodiments, the output interfaces of the communication bar and the power bar can be of different sizes, different orientations, different shapes, and so on, in order to prevent mis-insertion. In one embodiment, the output interfaces of the communication bar are circular in shape, while the output interfaces of the power bar are oval in shape. In another embodiment, the output interfaces of the communication bar are smaller or larger than the output interfaces of the power bar. In yet another embodiment, the output interfaces of the communication bar can be oriented in one direction (such as the left side of the communication bar), while the output interfaces of the power bar can be oriented in another direction (such as the right of the power bar). It should be understood that the implementations of the output interfaces of the communication bar and the power bar above are only illustrated but not limited. Furthermore, the output interfaces of the communication bar and the power bar can be of other different shapes, such as one is rectangular, and the other one is trapezoid.

Once the input of the power bar is connected, power can be distributed for the controller, the I/O modules and the terminal boards. While the input of the communication bar is connected, communication can also be established between the I/O modules and the terminal boards, or between the controller and the I/O modules.

The numbers of the controllers, the power supplies, the I/O modules and the terminal boards can be determined according to various applications respectively. The numbers of the controllers, the power supplies, the I/O modules and the terminal boards shown in FIG. 2 are only illustrated but not limited.

In the embodiments of the present application, there is no separate power cable or communication cable. Instead, the power bar and the communication bar are installed in the cabinet to provide power and link modules for data exchange. The use of the communication bar together with the power bar can reduce both cable cost and engineering time. Meanwhile, less cable also means lower risk for installation error.

In one embodiment, the I/O modules or the terminal boards are directly installed on the power bar or the communication bar.

In another embodiment, the I/O modules or the terminal boards are connected to the power bar or the communication bar by connectors and short cables.

Figure 3:
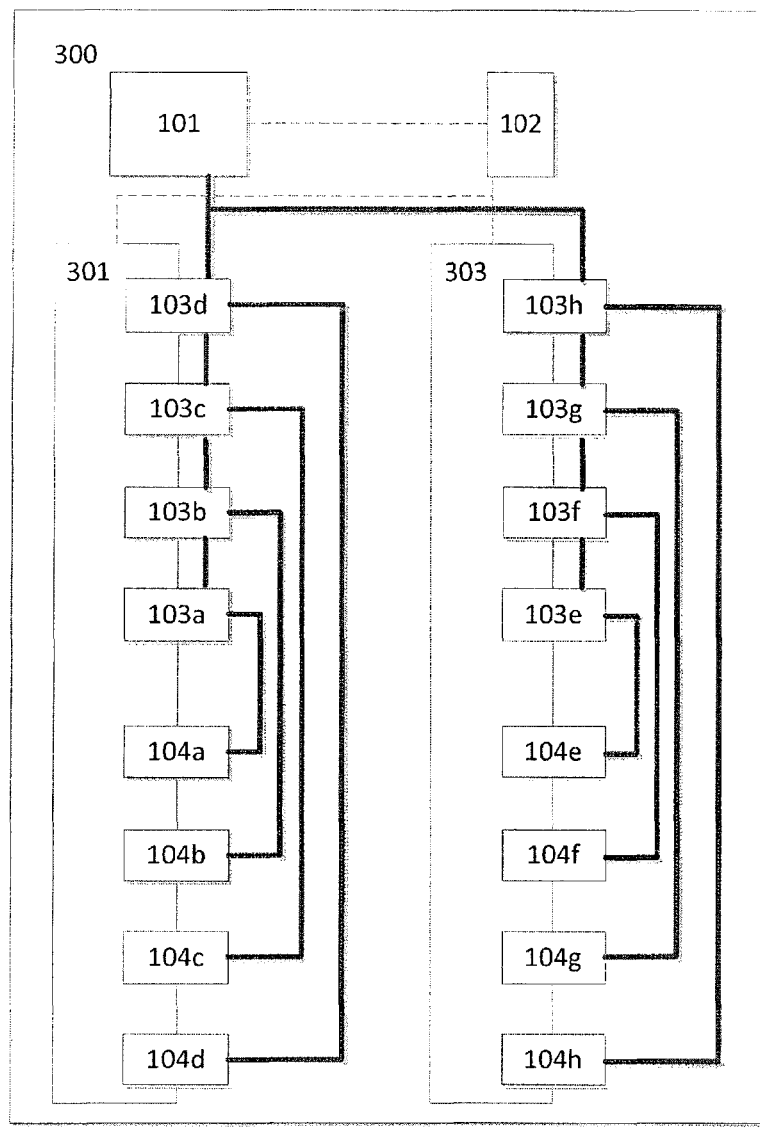
FIG. 3 is a diagram illustrating another cabinet of the industrial control system according to an embodiment of the present disclosure.

FIG. 3 is a diagram illustrating another cabinet of the industrial control system according to an embodiment of the present disclosure.

According to an embodiment of the present disclosure, as shown in FIG. 3, the industrial control system comprises a cabinet 300, which houses a controller 101, a power supply 102, a plurality of I/O modules (103a, 103b, . . . 103h), a plurality of terminal boards (104a, 104b, . . . 104h), two power bars 301 and 303, and a plurality of communication cables.

Each power bar has an input connected with the power supply and a plurality of output interfaces, wherein each output interface connects with one I/O module or one terminal board. Furthermore, the communication cables connect the controller to the I/O modules, and further connect each I/O module to one corresponding terminal board respectively.

In the embodiments of the present application, the power bar is installed in the cabinet to provide power. Once the input of the power bar is connected, power can be distributed for the controller, the I/O modules and the terminal boards. The numbers of the controllers, the power supplies, the I/O modules and the terminal boards shown in FIG. 3 are only illustrated but not limited.

Using the power bar to distribute power inside the cabinet can reduce the usage of the power cables.

In one embodiment, the I/O modules or the terminal boards are directly installed on the power bar.

In one embodiment, the I/O modules or the terminal boards are connected to the power bar by connectors and short cables.

Figure 4:
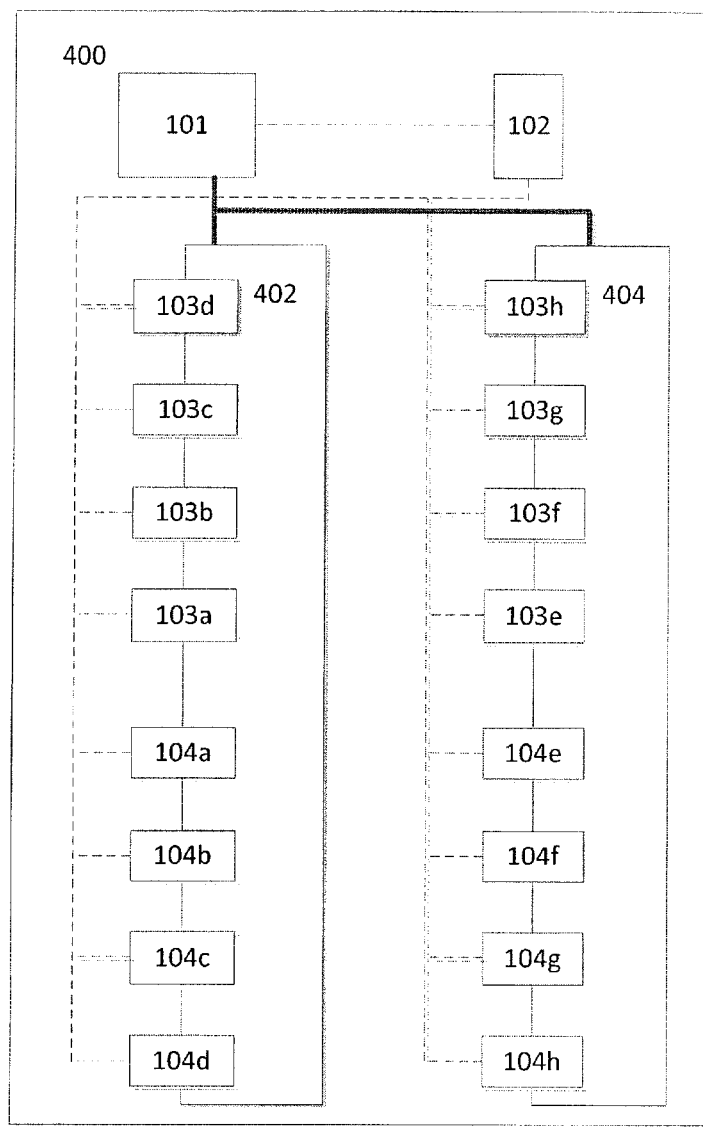
FIG. 4 is a diagram illustrating yet another cabinet of the industrial control system according to an embodiment of the present disclosure.

FIG. 4 is a diagram illustrating yet another cabinet of the industrial control system according to an embodiment of the present disclosure.

According to an embodiment of the present disclosure, as shown in FIG. 4, the industrial control system comprises a cabinet 400, which houses a controller 101, a power supply 102, a plurality of I/O modules (103a, 103b, . . . 103h), a plurality of terminal boards (104a, 104b, . . . 104h), two communication bars 402 and 404, and a plurality of power cables.

Each communication bar has an input connected with a controller and a plurality of outputs, wherein each output connects with one I/O module or one terminal board. Furthermore, the power cables connect the power supply with the I/O modules and the terminal boards respectively. Wherein each I/O module communicates with one corresponding terminal board through the communication bar respectively.

There are preset conductive paths for transmitting signal in the communication bar. The conductive paths can be formed by conductive material, such as copper. In one embodiment, there are at least two conductive paths.

The output interfaces used for each of the I/O modules and the terminal boards in the communication bar can be the same, and one I/O module and its corresponding terminal board can be paired through communication protocol and physical address, which can be preset in the I/O modules and terminal boards. For example, after connecting I/O modules and terminal boards with the communication bar, each I/O module can be mated with its corresponding terminal board by broadcasting its type or other information. In this way, there is no need to distinguish interfaces used for I/O modules and terminal boards, which will significantly ease the work. It should be understood that the output interfaces used for each of the I/O modules and the terminal boards in the communication bar could be different.

In the embodiments of the present application, the communication bars are installed in the cabinet to form communication paths. Once the input of the communication bar is connected, communication can also be established between the I/O modules and the terminal boards, or between the controller and the I/O modules. The numbers of the controllers, the power supplies, the I/O modules and the terminal boards shown in FIG. 4 are only illustrated but not limited.

Using communication bar to establish internal bus for data exchange can provide common communication channel inside one cabinet.

In one embodiment, wherein the I/O modules or the terminal boards are directly installed on the communication bar.

In one embodiment, wherein the I/O modules or the terminal boards are connected to the communication bar by connectors and short cables.

It should also be noted that the above described embodiments are given for describing rather than limiting the invention, and it is to be understood that modifications and variations may be resorted to without departing from the spirit and scope of the invention as those skilled in the art readily understand. Such modifications and variations are considered to be within the scope of the invention and the appended claims. The protection scope of the invention is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed is:

1. An industrial control system, comprising:
   a plurality of I/O modules;
   a plurality of terminal boards;
   at least one communication bar having an input connected with a controller and a plurality of output interfaces, wherein each output interface connects with one I/O module or one terminal board; and
   at least one power bar having an input connected with a power supply and a plurality of output interfaces, wherein each output interface connects with one I/O module or one terminal board;
   wherein each I/O module communicates with its corresponding terminal board through the communication bar respectively.

2. The industrial control system according to claim 1, wherein the I/O modules or the terminal boards are installed on the power bar or the communication bar directly or through connectors and short cables.

3. The industrial control system according to claim 2, wherein the communication bar comprises at least two conductive paths which are formed by conductive material for transmitting signals between one of the plurality of I/O modules and one corresponding terminal board.

4. The industrial control system according to claim 2, wherein each I/O module is paired with one corresponding terminal board by presettable address and protocol.

5. The industrial control system according to claim 1, wherein the communication bar comprises at least two conductive paths which are formed by conductive material for transmitting signals between one of the plurality of I/O modules and one corresponding terminal board.

6. The industrial control system according to claim 5, wherein the output interfaces of the communication bar and the power bar are of different sizes, different inserting direction or different shapes.

7. The industrial control system according to claim 6, wherein the industrial control system is a distributed control system.

8. The industrial control system according to claim 1, wherein each I/O module is paired with one corresponding terminal board by presettable address and protocol.

9. The industrial control system according to claim 1, wherein the I/O modules and the terminal boards are installed on the communication bar directly.

10. The industrial control system according to claim 9, wherein the I/O modules and the terminal boards are installed on the power bar directly.

11. The industrial control system according to claim 1, wherein the I/O modules and the terminal boards are installed on the power bar directly.

12. The industrial control system according to claim 1, wherein the I/O modules or the terminal boards are installed on the communication bar through connectors and short cables.

13. The industrial control system according to claim 1, wherein the I/O modules or the terminal boards are installed on the power bar through connectors and short cables.

14. The industrial control system according to claim 1, further comprising a cabinet housing the controller, the plurality of I/O modules, the plurality of terminal boards, the at least one communication bar, and the at least one power bar.

15. The industrial control system according to claim 14, wherein the I/O modules and the terminal boards are installed on the communication bar directly.

16. The industrial control system according to claim 15, wherein the I/O modules and the terminal boards are installed on the power bar directly.

17. The industrial control system according to claim 16, wherein each I/O module is paired with one corresponding terminal board by presettable address and protocol.

18. The industrial control system according to claim 17, wherein the industrial control system is a distributed control system.

* * * * *